US007908519B2

(12) United States Patent
Wu et al.

(10) Patent No.: US 7,908,519 B2
(45) Date of Patent: Mar. 15, 2011

(54) TROUBLE EMULATOR FOR A RULES-BASED DIAGNOSTIC SYSTEM

(75) Inventors: Teh-Hsin K Wu, Holmdel, NJ (US); Paritosh Bajpay, Edison, NJ (US); Jackson Liu, Middletown, NJ (US); Zhenzhen Wang, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 330 days.

(21) Appl. No.: 12/275,905

(22) Filed: Nov. 21, 2008

(65) Prior Publication Data

US 2010/0131799 A1 May 27, 2010

(51) Int. Cl.
*G06F 11/00* (2006.01)

(52) U.S. Cl. ............... 714/28; 714/26; 714/32; 714/703

(58) Field of Classification Search .................... 714/26, 714/28, 32, 33, 703

See application file for complete search history.

(56) References Cited

U.S. PATENT DOCUMENTS

| | | | | |
|---|---|---|---|---|
| 4,695,946 | A | 9/1987 | Andreasen et al. | |
| 5,703,871 | A | 12/1997 | Pope et al. | |
| 5,790,634 | A | 8/1998 | Kinser, Jr. et al. | |
| 5,864,563 | A | 1/1999 | Ratcliffe | |
| 6,249,812 | B1 * | 6/2001 | Cromer et al. | 709/221 |
| 6,516,055 | B1 * | 2/2003 | Bedeski et al. | 379/32.01 |
| 6,654,914 | B1 | 11/2003 | Kaffine et al. | |
| 7,249,284 | B2 * | 7/2007 | Shah et al. | 714/33 |
| 2004/0153792 | A1 * | 8/2004 | Merriam | 714/26 |
| 2004/0203755 | A1 * | 10/2004 | Brunet et al. | 455/432.1 |
| 2006/0092861 | A1 * | 5/2006 | Corday et al. | 370/256 |
| 2007/0220341 | A1 * | 9/2007 | Apostoloiu et al. | 714/33 |
| 2008/0033708 | A1 * | 2/2008 | Kanapka et al. | 703/14 |
| 2008/0072100 | A1 * | 3/2008 | Okada | 714/28 |

* cited by examiner

*Primary Examiner* — Joshua A Lohn

(74) *Attorney, Agent, or Firm* — Hoffmann & Baron, LLP

(57) ABSTRACT

Embodiments of the present invention are directed to validating a rules-based diagnostic system for a network. Emulated data for use by the rules-based diagnostic system can be generated that includes a trouble ticket to emulate a problem associated at least one of Layer 1 and Layer 2 network services and includes network information associated with the problem. Responses from the rules-based diagnostic system can be received in response to the emulated data being processed by the rules-based diagnostic system. A log generated by the rules-based diagnostic system can be analyzed to determine rules implemented by the rules-based diagnostic system in response to the emulated data, thereby validating operation of the rules-based diagnostic system.

18 Claims, 8 Drawing Sheets

*FIG. 3*

<?xml version="1.0" encoding="UTF-8"
standalone="yes"?>
<ctcTestResponse>
<testResults>
◦ ◦ ◦
<testParms>
<testName>GetRISJuniper</testName>
<entityClass>IP</entityClass>
<entityType>NODE_NAME</entityType>
◦ ◦ ◦
<summary>
◦ ◦ ◦
<testState>
<state>Completed</state>
</testState>
</testOutcome>
<outcome>OK</outcome>
</testOutcome>
<GetRISJuniperSummary>
<snapShotList>
<snapShotDate>
<cmdReturn><physical-interface>\n +
◦ ◦ ◦
</traffic-statistics>\n +
</physical-interface>
</cmdReturn>
</snapShotData>
<snapShotData>
<cmdReturn><physical-interface>\n +
◦ ◦ ◦
</physical-interface>
</cmdReturn>
</snapShotData>
</snapShotList>
<summaryComparison>
<linkStatus>up</linkStaus>
<protocolStatus>up</protocolStatus>
<loopStatus>Up</loopStatus>
◦ ◦ ◦
</summaryComparison>
</GetRISJuniperSummary>
</summary>
</testResults>
</ctcTestResponse>

<comment><![Begining Analysis on this ticket]]></comment>
<troubleTicketId>78060001100</troubleTicketId>

∘ ∘ ∘

<comment><![Higher level Facility Lookup CLFI=XXX Higher Level
Customer CLFI = YYY]]></comment>

∘ ∘ ∘

<comment><![CDATA[(123) 2 Show Interface commands 60 second apart.
Interface status:...Statistics incremented in 60 second:...
Interface snapshot: <rpc><get-interface-information>...
</get-interface-information></rpc>

∘ ∘ ∘

<admin-status junos:format="Enabled">down</admin-status>
<oper-status>down</oper-status>

404

∘ ∘ ∘

<if-device-flags><ifdf-present/><ifdi-running/><ifdf-down/> ...
<ifmf-keepalives/></if-media-flags><up-hold-time>0
</up-hold-time><down-hold-time>0</down-hold-time>
<keepalive-config> ...
<lcp-state>Down</lcp-state></comment>

∘ ∘ ∘

<comment><![CDATA[(157) Command indicates port administratively down]]></comment>

∘ ∘ ∘

<comment><![Check Access Router information and/or Auto Test results posted in the ticket log. Continue troubleshooting.]]>

∘ ∘ ∘

<comment><![CDATA[(8491) initial trouble assesment completed. Further analysis by Service Provider.]]></comment>

TROUBLE EMULATOR FOR A RULES-BASED DIAGNOSTIC SYSTEM

BACKGROUND OF THE INVENTION

1. Field of the Invention

The present invention relates to network diagnostic and simulating, and specifically, to Layer 1 and Layer 2 network rules based diagnostic and simulating.

2. Brief Description of the Related Art

Problems in a communication network, such as Layer 2 outages, can impact operation of the network and can result in downtime during which customers may not be able to use the network. Typically, the service provider is charged with diagnosing and resolving the problem in the network to minimize downtime. Generally, the service provider's technicians manually diagnose and resolve the problem. Such manual diagnostics can be time consuming and costly, both for the service provider and the customer. In addition, these manual diagnostic techniques can result in an inefficient use of the service provider's workforce.

Automated diagnosis of problems in communication networks has been introduced in recent years in an attempt to make the diagnosis process more cost and time efficient. A methodology for validating automated diagnostic processes is desired to ensure that the proper steps are being followed when diagnosing a problem with the network.

SUMMARY OF THE INVENTION

Embodiments of the present invention are directed a method and medium holding instructions executable by a computing device for validating a rules-based diagnostic system for a network. A trouble emulator is used to generate emulated data for use by the rules-based diagnostic system. The emulated data includes a trouble ticket to emulate a problem associated at least one of Layer 1 and Layer 2 network services and includes network information associated with the problem. Responses from the rules-based diagnostic system can be received by the trouble emulator in response to the emulated data being processed by the rules-based diagnostic system and a log generated by the rules-based diagnostic system can be analyzed to determine rules implemented by the rules-based diagnostic system in response to the emulated data, thereby validating operation of the rules-based diagnostic system.

Other embodiments of the present invention are directed to a system for validating a rules-based diagnostic system. The system is a computer system configured to implement a ticket simulator that generates a trouble ticket to emulate a problem associated at least one of Layer 1 and Layer 2 network services to be processed by the rules-based diagnostic system, an inventory system simulator that generates emulated network information associated with the problem to be processed by the rules-based diagnostic system when responding to the trouble ticket, and a test simulator that receives responses from the rules-based diagnostic system in response to the trouble being processed by the rules-based diagnostic system and to analyze a log generated by the rules-based diagnostic system to determine rules implemented by the rules-based diagnostic system in response to the emulated data, thereby validating operation of the rules-based diagnostic system.

Emulated data generated can include a circuit layout, network topology, and customer information to be processed by the rules-based diagnostic system. Emulated data can also include a test status of a local port of the network and/or a test status of a remote port.

An analysis of responses from the rules-based test system can be performed and a determination can be made as to whether the responses are expected for the emulated data that is generated. The responses can include checking a status of a network device and the method further comprises emulating the status of the network device with the emulated data. The rules implemented by the rules-based diagnostic system can be reviewed to ensure that the rules are configured to institute the responses that are appropriate for a problem being emulated.

Other objects and features of the present invention will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

FIG. 3 is an exemplary response from a diagnostic system during a validation of the diagnostic system.

FIG. 4 is an exemplary log that can be generated by a rules-based diagnostic system when responding to emulated data.

DETAILED DESCRIPTION OF THE PREFERRED EMBODIMENTS

Preferred embodiments of the present invention are directed a trouble emulator to validate a rules-based diagnostic system for a communications network. The rules-based diagnostic system uses rules when determining how to respond to a problem in the network, such as, layer 1 and/or layer 2 to failures including, for example, a network outage that impacts layer 2 services. The rules represent defined information used to identify and govern the particular steps to be followed to diagnose the problem. The trouble emulator can generate trouble tickets, which are alarms associated with a network outage that impacts, for example, layer 1 and/or layer 2 services of the network. The generated trouble tickets emulate alarms that the rules-based diagnostic system can receive from an actual network. Emulating network behavior is a process of simulating and/or mimicking an implemented physical network using software-based structures. The rules-based diagnostic system can respond to these trouble tickets using a rules-based process that attempts to isolate reason for the alarm and the trouble emulator can generate data used during the rules-based process to determine whether the responses by rules-based diagnostic system are appropriate.

As used herein, "validate" refers to a process of analyzing a diagnostic system to determine whether the diagnostic system can identify, isolate, and/or diagnose problems that can occur in a network.

The preferred embodiments enable service providers to validate a rule-based diagnostic system for a communication network to ensure that the rules-based diagnostic system operates to detect and isolate problems in a network quickly to eliminate and/or reduce network downtime experienced by a customer when a problem occurs. Ensuring that the rules-based diagnostic system operates accordingly, can reduce the time and labor required of an operator to find, diagnose, and resolve the problem. This allows the service provider to provide a high quality of service, while reducing costs associated with network maintenance.

Figure 1:
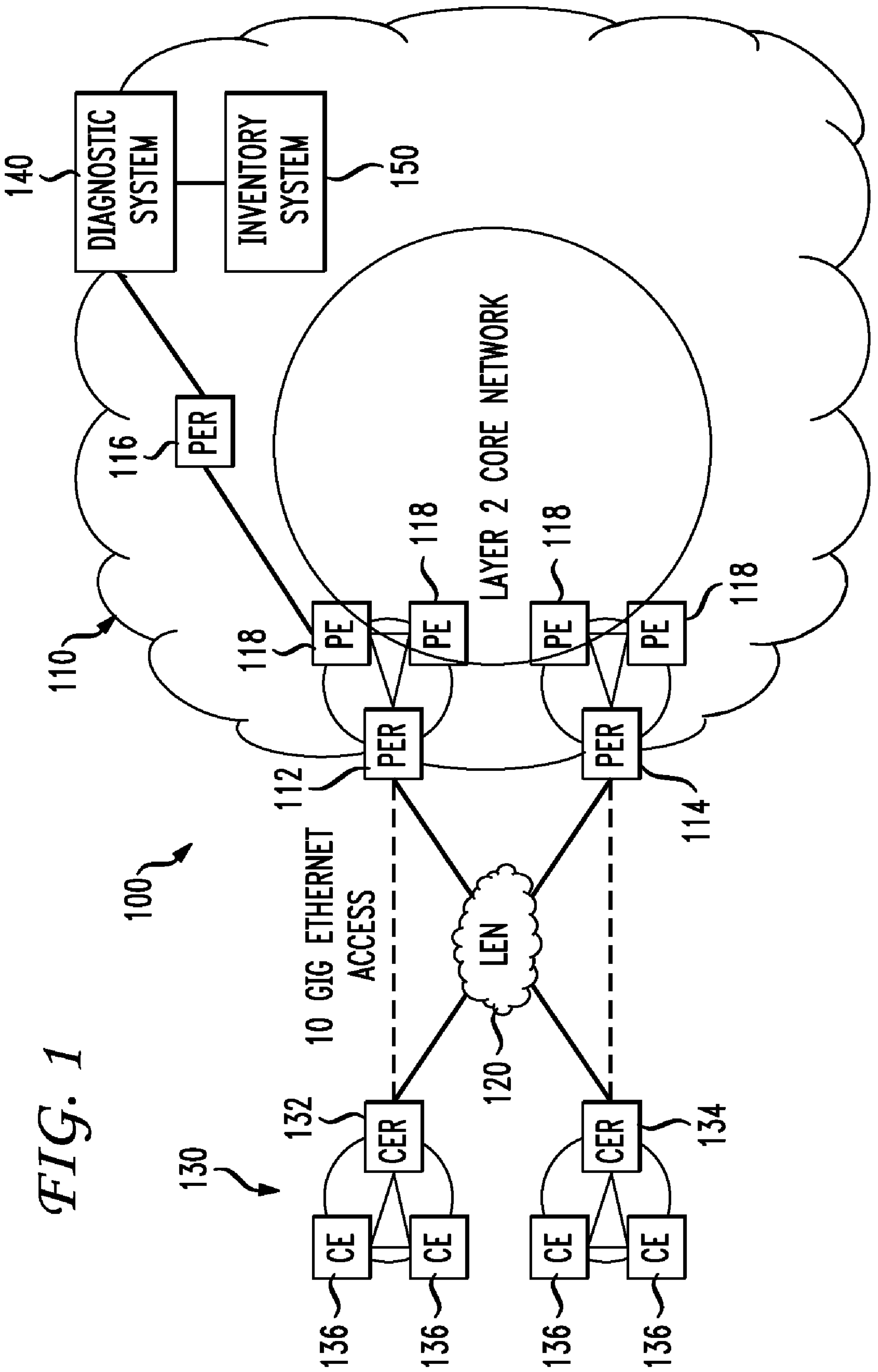
FIG. 1 shows an exemplary network architecture in accordance with preferred embodiments of the present invention.

FIG. 1 depicts an exemplary service provider network architecture 100 (hereinafter "network 100") in accordance with the preferred embodiments of the present invention. The network 100 preferably includes a service provider network 110 (hereinafter "network 110"), a local exchange network (hereinafter "LEN 120") and/or a customer network 130. The provider network 100 includes provider edge routers (PERs) 112 and 114 and provider equipment (PE) 118, the implementation of which is commonly known to those skilled in the art. The PE 118 can be routers, switches, and the like. The PERs 112 and 114 provide an interface for communicative coupling the network 100 to the LEN 120 and/or the customer network 130, and can implement 10 gigabit Ethernet for transmitting data to the LEN 120 and/or to the customer network 130 via facilities (e.g., links, such as 10 GB Ethernet lines).

The LEN 120 can provide intermediate service for connecting the network 110 with the customer network 130. In some embodiments, the network 110 can connect directly to the customer network 130. The LEN 120 can include routers and switches for routing information between the customer network 130 and the network 110.

The customer network 130 can include customer edge routers (CERs) 132 and 134, which provide an interface through which the LEN 120 and/or the network 100 can connect to the customer network 130. The CERs 132 and 134 can have associated IP address where the CER 132 IP address is the local or lowest IP address of the customer network 130 and the CER 134 IP address is the remote or highest IP address of the customer network 130. The customer networks 130 can also include customer equipment (CE) 136, such as customer routers and switches, or other devices.

A rules-based diagnostic system 140 (hereinafter "diagnostic system 140") can be connected to the network 100 or incorporated into the network 100. The diagnostic system 140 is a system for isolating and diagnosing problems in the network 100. The diagnostic system 140 can be implemented as one or more applications by one or more computing devices, which are communicatively coupled to the network 100. The diagnostic system can use rules to implement a sectionalized approach to isolate a problem in the network 100 to a particular layer, type, and/or location using a rules-based approach. The rule can control how the diagnostic system reacts to information from the network to provide a codified approach to diagnosing problems, such as network outages in a network.

An inventory system 150, such as a database, can be communicatively coupled to the system 140 either directly or through, for example, the network 100. The inventory system 150 can hold information about the network 100, such as customer information, a network configuration, circuit layout, and/or a network topology. Such information can include PER IP addresses, CER IP addresses, route information, Virtual Routing and Forwarding (VRF) names, a route target, community list, community value, a route map action, and the like. The diagnostic system can access the inventory system to obtain information about the network. Some, all, or none of the information in the inventory system can be static.

Figure 2:
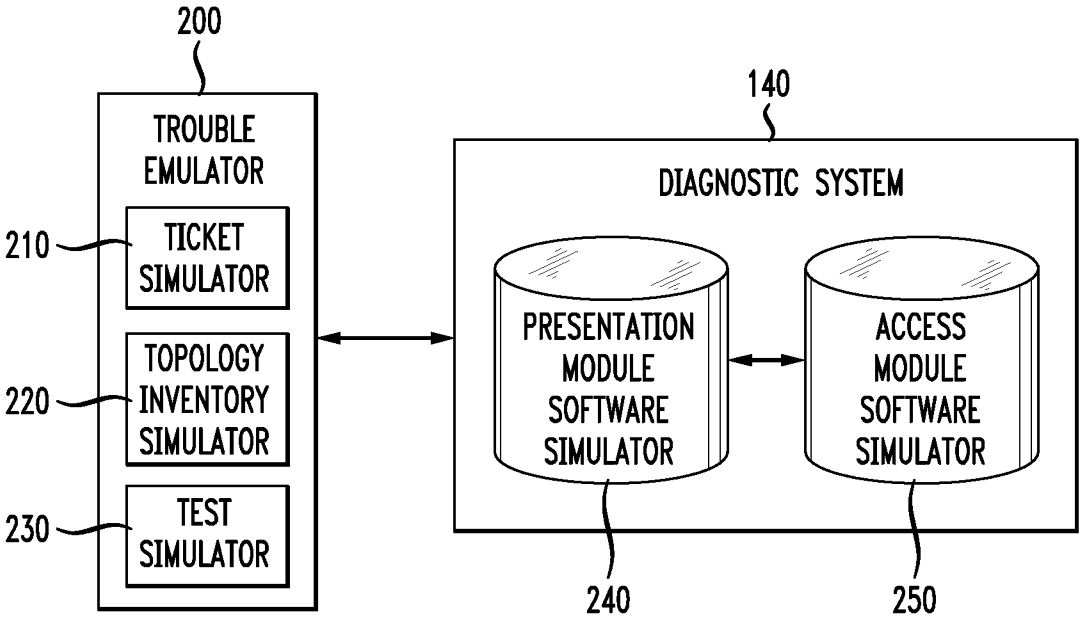
FIG. 2 is a block diagram of a trouble emulator for validating a rules-based diagnostic system.

FIG. 2 is a block diagram of a trouble emulator 200 that can be used to validate the diagnostic system 140. The trouble emulator 200 can collect data from the actual physically implemented network to generate emulated data. Emulated data is information generated by the trouble emulator for simulating and/or mimicking the physical network 100 when a problem exists. For example, the trouble emulator can access routers and the inventory system associated with the network to collect information such as configuration information, including routing information, router status information, router response information, and the like. The trouble emulator 200 can interface with the diagnostic system 140 and can use the emulated data to interact with the diagnostic system 140 so that the diagnostic system 140 operates as if it is interacting with the actual network 100. In some embodiments, the diagnostic system does not know it is not interfacing with the network and that an actual network problem does not exist. In other embodiments, the diagnostic system knows it is being validated. The trouble emulator 200 includes a ticket simulator 210, an inventory system simulator 220, and a test simulator 230.

The ticket simulator 210 generates emulated trouble tickets in a form that mimics actual trouble tickets issued from within the network 100. The trouble tickets are sent to the diagnostic system, which responds to the trouble ticket as if there was an actual trouble ticket. The trouble ticket can be associated with a problem that the network 100 can encounter, such as a network outage that impacts layer 2 network services. Layer 2 refers to a data link or logical layer of a network that is built on the physical layer (i.e. Layer 1) of the network. Layer 2 of a network can be used to implement protocols, such as Ethernet, Asynchronous Transfer Mode (ATM), Frame Relay, and the like. The trouble tickets can initiate the rules-based process implemented by the diagnostic system 140 and the diagnostic system 140 can generate responses to the trouble tickets to isolate to problem being emulated by the trouble emulator 200 using the rules. Responses can include the execution of commands, queries, ping tests, or other techniques for gathering information about the network, as well as the generation of reports, notifications, and the like.

The inventory system simulator 220 can emulate the inventory system 150 and the information held in the inventory system 150. For example, the inventory system simulator 220 can emulate the topology inventory data for the network 100 and a test status for ports in the network so that when the diagnostic system accesses the inventory system simulator 220, the diagnostic system accesses information that emulates information that is generally accessed in the actual network. Using the information emulated in the inventory system simulator 220, the diagnostic system 140 can begin to isolate the emulated problem.

The test simulator 230 can provide centralized control for the trouble emulator 200 to control the operation of the ticket simulator 210 and the inventory system simulator 220. The test simulator 230 can identify a problem to be emulated and can instruct the ticket simulate to emulate a ticket associated with the problem. The test simulator 230 can also manipulate the emulated information generated by the inventory system simulator 220 to correspond to the problem being emulated such that when the diagnostic system 140 accesses the information generated by the inventory system simulator 140, the emulated information reflects the problem being emulated.

The test simulator 230 can receive responses from the diagnostic system 140 and can provide the diagnostic system 140 with emulated data corresponding to the responses. The test simulator 230 can modify the emulated data based on the responses received from the diagnostic system to test the rules implemented by the diagnostic system 140. The test simulator 230 can analyze a log generated by the diagnostic system 140 to determine which rules are implemented by the diagnostic system 140 when responding to the emulated data. The log is a summary that can identify rules implemented by the diagnostic system 140 in response to emulated data provided by the trouble emulator 200. The log and the response by the diagnostic system 140 can be used to validate operation of the diagnostic system 140.

The diagnostic system includes a presentation module software simulator 240 (hereinafter "presentation simulator 240") and an access module software simulator 250 (hereinafter "access module 250") for interfacing with the trouble emulator 200. The presentation simulator 240 coordinates the interactions among other simulators including components of the trouble emulator 200 (e.g., simulator 210, simulator 220, and simulator 230). The presentation simulator 240 controls the automation sequence and determines when and where to implement the simulated rules. The access simulator 250 simulates the interfaces with other simulators (e.g., trouble emulator 200), controls the simulated commands and responses, stores the simulated data retrieved from other simulators.

FIG. 3 is a portion of an exemplary response 300 that can be generated by the diagnostic system 140. The response 300 can be generated as an Extensible Mark-up Language (XML) document. In the present example, the response 300 related to the diagnostic system checking an interface status of a router to determine whether a link or protocol is functioning properly. Although the exemplary response is in the form of an XML document, those skilled in the art will recognize that responses can be generated in any suitable format.

FIG. 4 is an exemplary log 400 that can be generated by the diagnostic system 140 and that can be obtained by the trouble emulator to identify whether the diagnostic system implements appropriate rules in response to emulated data generated by the trouble emulator 200. In the present example, the log 400 is implemented in an XML document, although those skilled in the art will recognize other formats can be used. The log 40 can identify, for example, HTTP requests, in which the diagnostic system 140 implements the diagnostic process. Comments 402 can be used to illustrate to a reader of the log 400 the diagnostic process being performed. The log 400 can also include rules 404 for determining how the diagnostic system 140 responds to the emulated data. In this example, the diagnostic system 140 implements rules 404 when determining the port status of a PE router.

Figure 5:
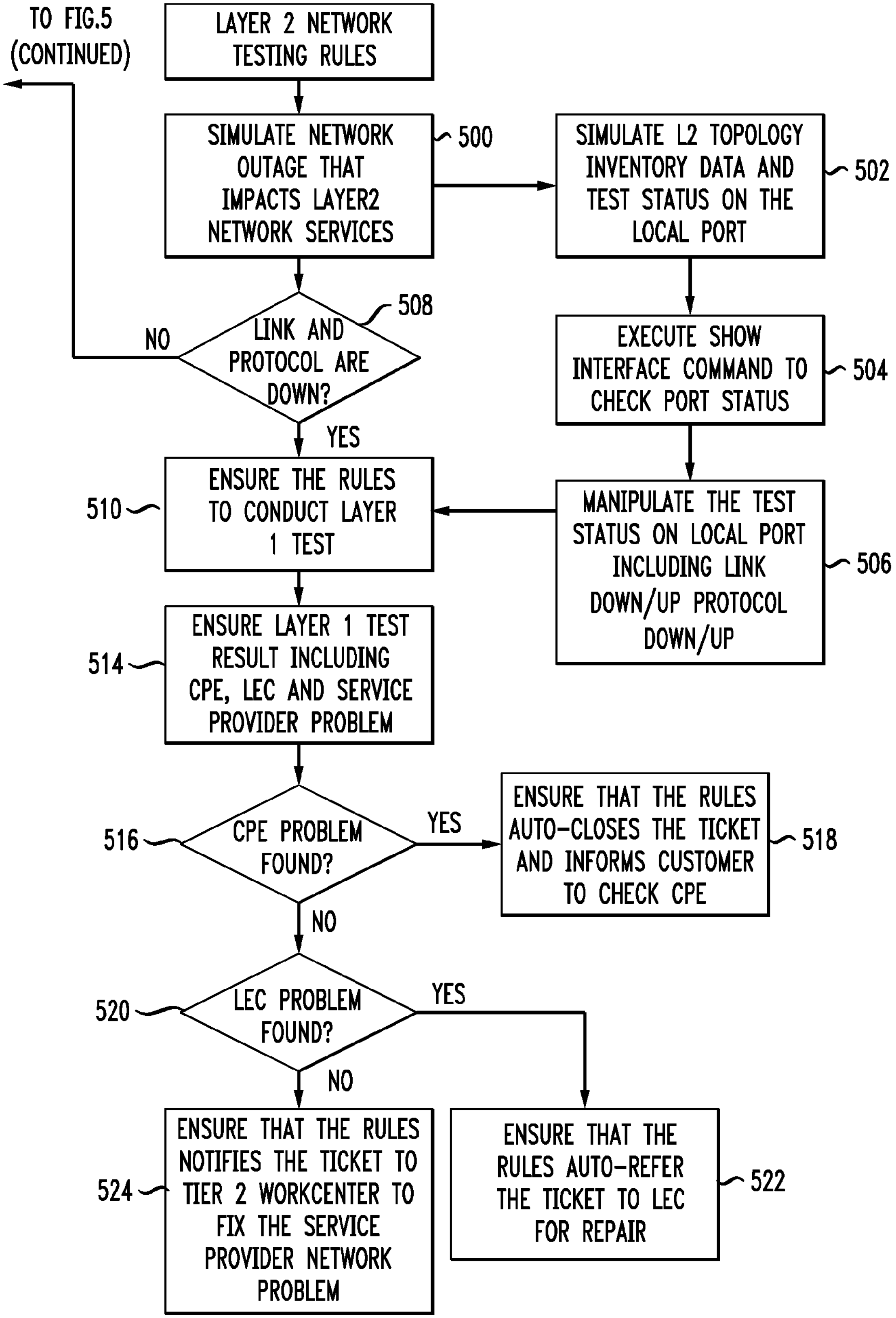
FIG. 5 is a flowchart illustrating an exemplary validation of a rules-based diagnostic system.
Figure 5:
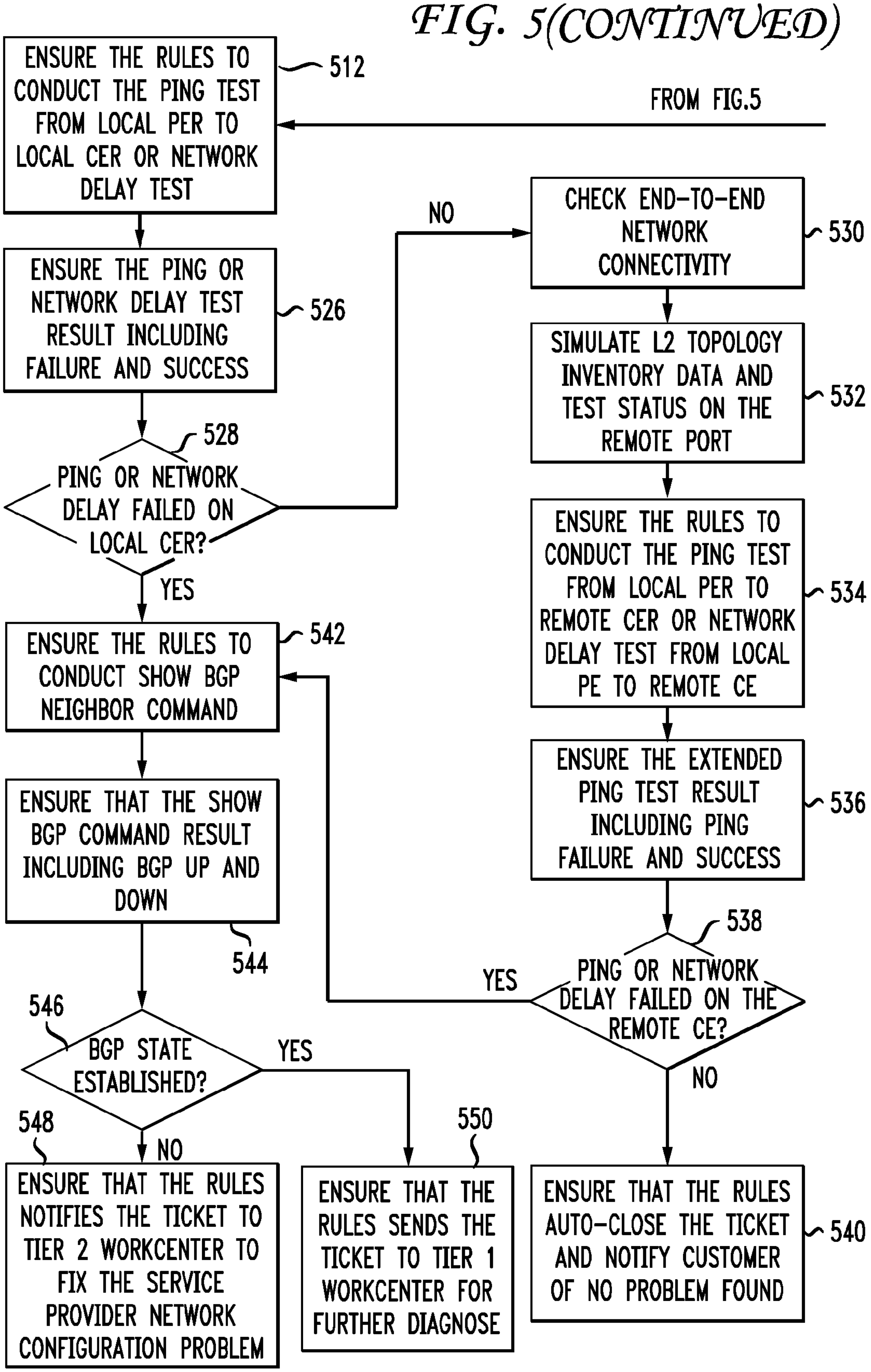

FIG. 5 is a flowchart illustrating an exemplary process for validating the diagnostic system 140. To validate the diagnostic system 140, the trouble emulator 200 interacts with the diagnostic system 140 without requiring the diagnostic system to interact with the actual network 100. As such, the trouble emulator 200 provides a virtual environment in which the diagnostic system 140 can be validated using emulated network behavior to ensure the rules implemented by the diagnostic system 140 are suitable for the customers needs. The information used by the trouble emulator 200 is carefully generated to exercise the rules-based approach implemented by the diagnostic system to ensure that when the diagnostic system 140 interacts with the network 100, the diagnostic system 140 responds appropriately to trouble tickets for actual network problems, such as outages that impact layer 2 network services.

The ticket simulator 210 can generate a trouble ticket that can be received by the diagnostic system 140 to simulate a network outage that impacts Layer 2 network services (step 500) and the inventory system simulator 220 emulates Layer 2 topology inventory data and emulates a test status of a local port (step 502). The topology inventory data simulated by the inventory system simulator 220 can mimic the topology and configuration of the network 100. In response to the trouble ticket, the diagnostic system 140 can generate a command for checking a status of a port (step 504). Rather then sending the command to an actual port, the command is forwarded to the test simulator, which returns an emulated test status for the local port including an indication of whether the link is up or down and/or whether the protocol is up or down (step 506).

Based on the emulated test status for the local port, the diagnostic system 140 determines whether the link and/or protocol are down (step 508). If the diagnostic system determines that the links and/or protocol are down (step 508), the test simulator 230 obtains a log from the diagnostic system to ensure that the rules for conducting layer 1 testing are correct (step 510). Otherwise, the test simulator 230 obtains a log from the diagnostic system to ensure that the rules for conducting a ping test from a local provider edge router to a local customer edge router are correct and/or to ensure that the rules for conducting the network delay test are correct (step 512).

For the case where trouble emulator 200 generated emulated data to represent down links and/or protocols down (step 508), the diagnostic system 140 can implement Layer 1 testing and the trouble emulator can ensure the Layer 1 test results agree with the problem being emulated (step 514). Using the emulated data generated by the trouble emulator, the diagnostic system 140 determines whether the emulated problem corresponds to Customer Premises Equipment (CPE) (e.g., customer equipment) problem (step 516). If the diagnostic system 140 determines that it the emulated problem is associated with a CPE (step 516), the trouble emulator 200 checks the log to ensure that the rules implemented by the diagnostic system 140 result in an automatic closing of the trouble ticket and a notification being sent to the customer requesting that the customer check the CPE (step 518). If the diagnostic system 140 determines that it was not a CPE problem (step 516), the diagnostic system 140 determines whether the emulated problem is a LEN problem (step 520).

For the case where the diagnostic system 140 determines the emulated problem is associated with a LEN problem based on the emulated data generated by the validation emulator (step 520), the trouble emulator 200 checks the log to ensure that the rules implemented by the diagnostic system 140 result in an automatic referral of the trouble ticket to the LEN for repair (step 522). Otherwise, the trouble emulator checks the log to ensure that the rules implemented by the diagnostic system result in a notification that the problem is associated with the service provider's network (step 524).

For the case where trouble emulator 200 generated emulated data to represent links and protocols operating properly (step 508), the trouble emulator 200 checks to ensure that the rules for conducting a ping test from the local PER to local CER and/or for conducting a network delay test are correct (step 526). The diagnostic system 140 subsequently implements the ping test and/or the network delay test and the trouble emulator 200 uses emulated data to control a result of the test. The trouble emulator 200 checks the ping and/or network delay test results, including whether the diagnostic system 140 determined that the tests failed or succeeded in response to the emulated data provided by the trouble emulator 200 (step 528). If the diagnostic system 140 determines that the ping and/or network delay test did not fail on the local CER (step 528), the diagnostic system 140 checks end-to-end connectivity of the network (step 530). Otherwise, the trouble emulator 200 checks the log to ensure that the rules are configured to implement a command for identifying a Border Gateway Protocol (BGP) neighbor (e.g., a router directly connected to the PER router) (step 542).

For the case where the test did not fail, the inventory system simulator 220 emulates Layer 2 topology inventory data and emulates a test status of a remote port in preparation of endto-end connectivity tests (step 532). The trouble emulator 200 checks the log to ensure the correct rules are implemented for conducting a ping test from a local PER to a remote CER and/or for conducting a network delay test from the local PE to the remote CE (step 534). The diagnostic system 140 performs an extend ping test interfacing with the emulated data generated by the trouble emulator 200 and the trouble emulator 200 checks the results, including ping failure and success, to ensure that the diagnostic system 140 achieves the expected result (step 536). If the diagnostic system 140 determines that the ping and/or network delay tests did not fail on the remote CE (step 538), the trouble emulator 200 checks the log to ensure that the rules implemented automatically close the trouble ticket and a generated a notification to the customer that no problem was found (step 540).

Otherwise, the trouble emulator 200 checks the log to ensure that the rules are configured to implement a command for identifying a BGP neighbor (step 542). Subsequently, the trouble emulator 200 checks the command results for the show BGP command, including BGP up/down, to ensure that the diagnostic system obtains the result expected by the trouble emulator 200 (step 544). The diagnostic system 140 determines whether the BGP state established is established based on the emulated data (step 546). If the diagnostic system 140 determines that the BGP state is established (step 546), the trouble emulator 200 checks the rules implemented by the diagnostic system 140 to ensure that the rules generate a notification for the service provider indicating there may be a configuration problem in the provider's network (step 548). Otherwise, the trouble emulator 200 checks the rules implemented by the diagnostic system 140 to ensure that the rules generate a notification requesting further diagnosis be performed (step 550)

Figure 6:
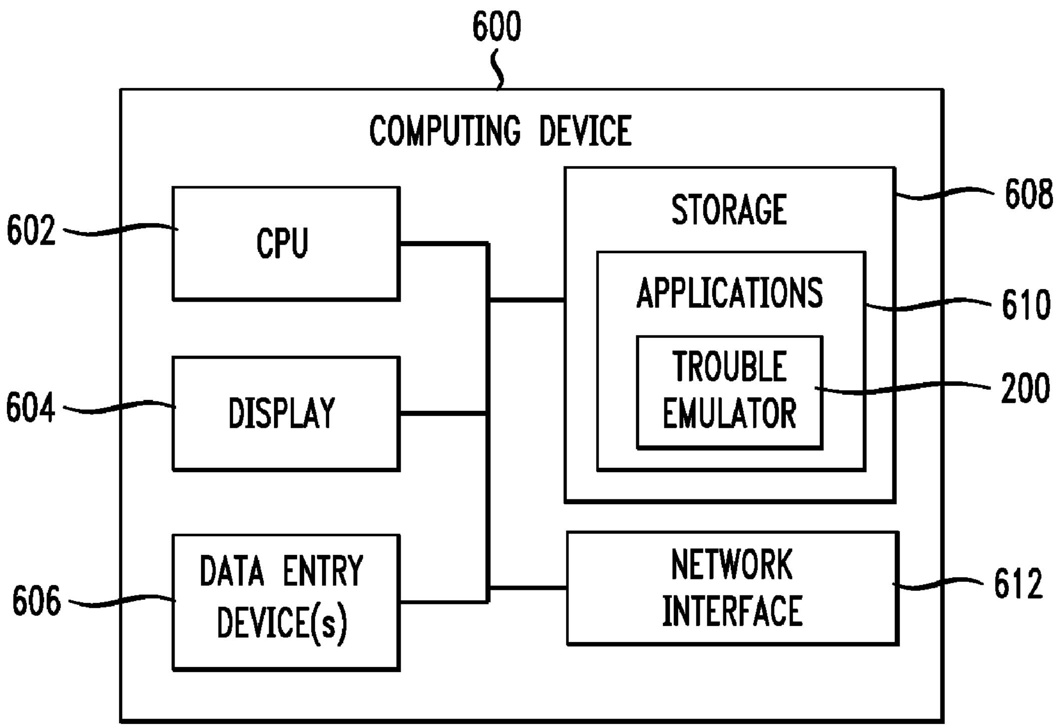
FIG. 6 is a block diagram of an exemplary computing device for implementing embodiments of the present invention.

FIG. 6 depicts an exemplary computing device 600 for implementing validation of a rules-based diagnostic system using the trouble emulator 200. The computing device 600 can be a mainframe, personal computer (PC), laptop computer, workstation, handheld device, such as a PDA, or the like. In the illustrated embodiment, the computing device 600 includes a central processing unit (CPU) 602 and preferably a display device 604. The display device 604 enables the computing device 600 to communicate directly with an operator through a visual display. The computing device 600 can further include data entry device(s) 606, such as a keyboard, touch screen, and/or mouse. The computing device 600 can include storage 608 for storing data and instructions. The storage 608 can include such technologies as a floppy drive, hard drive, tape drive, Flash drive, optical drive, read only memory (ROM), random access memory (RAM), and the like.

Applications 610, such as the trouble emulator 200 for validating a rules-based diagnostic system, as described above, can be resident in the storage 608. The applications 610 can include instructions for implementing the trouble emulator 200. The storage 608 can be local or remote to the computing device 600. The computing device 600 includes a network interface 612 for communicating with a network. The CPU 602 operates to run the application in storage 608 by performing instructions therein and storing data resulting from the performed instructions, which may be presented to an operator via the display 604 or by other mechanisms known to those skilled in the art, such a print out from a printer. The data can include the emulated data generated by the trouble emulator 200, which can include emulated inventory system information, trouble tickets, and the like, and can include response and rules implemented by the diagnostic system in response to the emulated data.

The trouble emulator 200 enables validation of the rules-based diagnostic system 140 and can validate, for example, the layer 2 diagnostic ability of the diagnostic system 140. This ensures that the diagnostic system 140 functions appropriately so that the service provider to react quickly to network problems to minimize the duration for which customers are affected by the problem to provide a high quality of service, while reducing costs associated with network maintenance.

Figure 7:
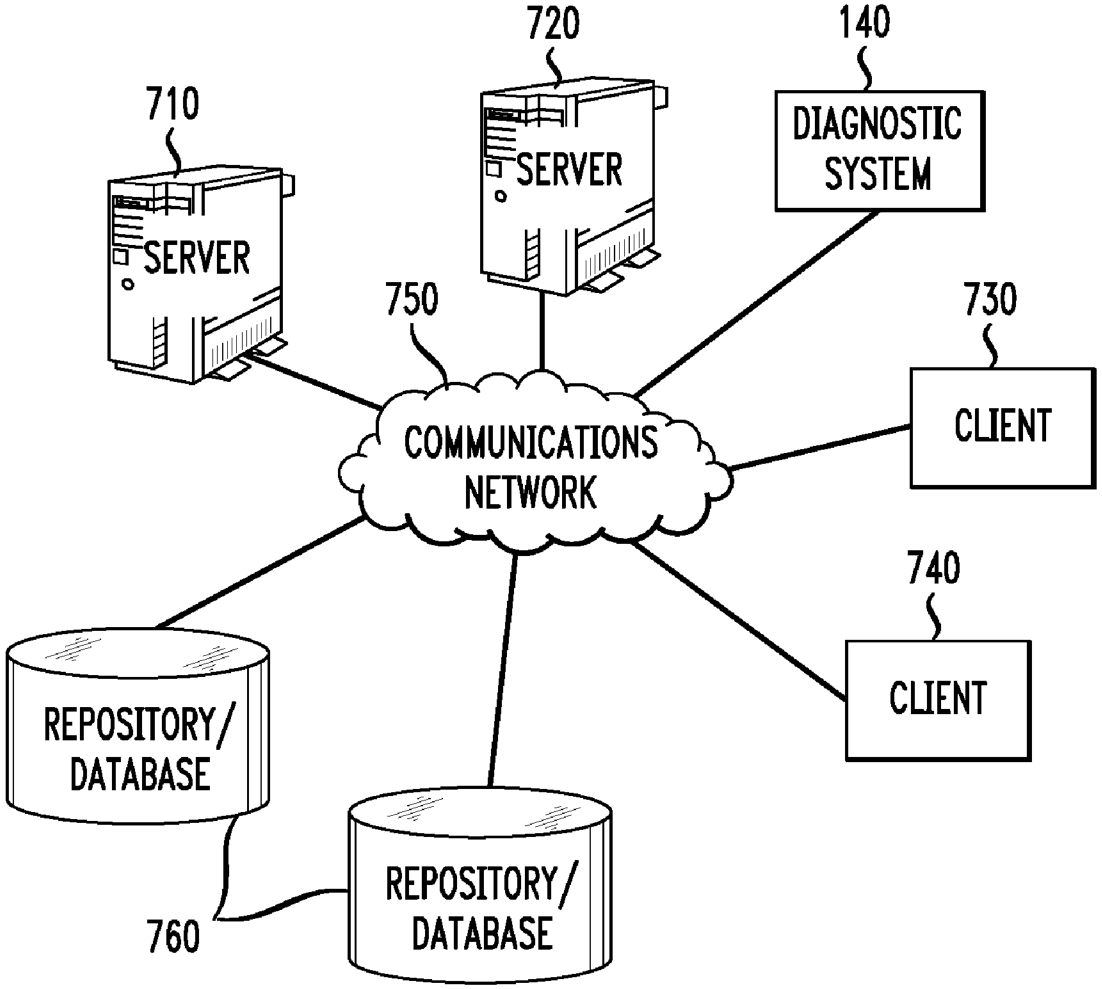
FIG. 7 is an exemplary distributed system for implementing embodiments of the present invention.

FIG. 7 depicts an exemplary distributed system 700 for implementing embodiments of the trouble emulator 200. The distributed system 700 includes one or more servers 710 and 720 coupled to clients 730 and 740, and the diagnostic system 140, via a communication network 750, which can be the service provider network 110, the customer network 130, and/or another network over which information can be transmitted between devices communicatively coupled to the network. The servers 710/720, clients 730/740, and/or the diagnostic system can be implemented using a computing device, such as the computing device 600 of FIG. 6. In some embodiments, at least a portion of the diagnostic system 140 and the trouble emulator 200 can be implemented using the same computing device. The distributed system 700 preferably includes one or more repositories or databases 760, which can be in communication with each other, as well as with the servers 710/720, clients 730/740, and diagnostic system 140 via a communications network 750.

The servers 710/720, clients 730/740, and/or databases 760 can store information, such as emulated data, responses, inventory system information, logs associated with the rules implemented by the diagnostic system, and the like. In some embodiments, the trouble emulator 200 can be distributed among the servers 710/720, clients 730/740, and databases 760 such that one or more components of the trouble emulator can be located at different device (e.g. clients, servers, databases) in the communication network 750. For example, the test simulator 230 can be resident on the client 730, the ticket simulator 210 can be resident on the server 710, and the inventory system simulator 220 can be resident on the server 720.

It is understood that the embodiments described herein can be implemented in hardware, software, or a combination of hardware and software. For example, embodiments can be implemented using a computer system configured to execute instructions of a computer program, which can control an operation of the computer system such that it carries out embodiments described herein. The computer system can be one or more computing devices, and in some embodiments the computer system can be implemented as a distributed system of networked computing devices. Alternatively, a specific use computer, containing specialized hardware for carrying out embodiments can be utilized.

Terms such as applications, computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While preferred embodiments of the present invention have been described herein, it is expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

What is claimed is:

1. A method of validating a rules-based diagnostic system for a network comprising:

generating emulated data for use by the rules-based diagnostic system, the emulated data including a trouble ticket to emulate a problem associated at least one of Layer 1 and Layer 2 network services and including network information associated with the problem;

receiving responses from the rules-based diagnostic system in response to the emulated data being processed by the rules-based diagnostic system; and analyzing a log generated by the rules-based diagnostic system to determine rules implemented by the rules-based diagnostic system in response to the emulated data, thereby validating operation of the rules-based diagnostic system.

2. The method of claim 1, wherein generating emulated data comprises generating circuit layout, network topology, and customer information to be processed by the rules-based diagnostic system.

3. The method of claim 1 further comprising:

analyzing the responses from the rules-based test system; and determining whether the responses are expected for the emulated data that is generated.

4. The method of claim 3 further comprising reviewing rules implemented by the rules-based diagnostic system to ensure that the rules are configured to institute the responses that are appropriate for a problem being emulated.

5. The method of claim 1, wherein generating emulated data includes emulating at least one of a topology inventor of a network, a test status of a local port of the network, a test status of a remote port.

6. The method of claim 1, wherein the responses include checking a status of a network device and the method further comprises emulating the status of the network device with the emulated data.

7. A computer-readable medium comprising instructions, wherein execution of the instructions by at least one computing device facilitates validating a rules-based diagnostic system for a network by:

generating emulated data for use by the rules-based diagnostic system, the emulated data including a trouble ticket to emulate a problem associated at least one of Layer 1 and Layer 2 network services and including network information associated with the problem;

receiving responses from the rules-based diagnostic system in response to the emulated data being processed by the rules-based diagnostic system; and analyzing a log generated by the rules-based diagnostic system to determine rules implemented by the rules-based diagnostic system in response to the emulated data, thereby validating operation of the rules-based diagnostic system.

8. The medium of claim 7, wherein execution of the instructions facilitates validating a rules-based diagnostic system for a network by generating circuit layout, network topology, and customer information to be processed by the rules-based diagnostic system.

9. The medium of claim 7, wherein execution of the instructions by at least one computing device facilitates validating a rules-based diagnostic system for a network by:

analyzing the responses from the rules-based test system; and determining whether the responses are expected for the emulated data that is generated.

10. The medium of claim 9 execution of the instructions by at least one computing device facilitates validating a rules-based diagnostic system for a network by reviewing rules implemented by the rules-based diagnostic system to ensure that the rules are configured to institute the responses that are appropriate for a problem being emulated.

11. The medium of claim 7, wherein generating emulated data includes emulating at least one of a topology inventor of a network, a test status of a local port of the network, a test status of a remote port.

12. The medium of claim 7, wherein the responses include checking a status of a network device and the execution of the instructions by at least one computing device facilitates validating a rules-based diagnostic system for a network by emulating the status of the network device with the emulated data.

13. A system for validating a rules-based diagnostic system comprising:

a computing system having one or more computing devices, the computing system configured to implement:

a ticket simulator to generate a trouble ticket to emulate a problem associated at least one of Layer 1 and Layer 2 network services to be processed by the rules-based diagnostic system;

an inventory system simulator to generate emulated network information associated with the problem to be processed by the rules-based diagnostic system when responding to the trouble ticket; and a test simulator to receive responses from the rules-based diagnostic system in response to the trouble being processed by the rules-based diagnostic system and to analyze a log generated by the rules-based diagnostic system to determine rules implemented by the rules-based diagnostic system in response to the emulated data, thereby validating operation of the rules-based diagnostic system.

14. The system of claim 13, wherein the inventory system simulator generates emulated data comprising circuit layout, network topology, and customer information to be processed by the rules-based diagnostic system.

15. The system of claim 13, wherein the test simulator is configured to analyze the responses from the rules-based diagnostic system and to determine whether the responses are expected for the emulated data that is generated.

16. The system of claim 15, wherein the test simulator is configured to review rules implemented by the rules-based diagnostic system to ensure that the rules are configured to institute the responses that are appropriate for the problem being emulated.

17. The system of claim 13, wherein inventory system simulator is configured to generate emulated data including emulating at least one of a topology inventor of a network, a test status of a local port of the network, and a test status of a remote port.

18. The system of claim 13, wherein the test simulator is configured to receive responses from the diagnostic system including responses checking a status of a network device and the test simulator is configured to emulate the status of the network device with the emulated data.

* * * * *